(12) United States Patent
Mentrup et al.

(10) Patent No.: US 6,826,281 B1
(45) Date of Patent: Nov. 30, 2004

(54) STORAGE-ENCRYPTION-RETRIEVAL DEVICE AND METHOD WITH RESULTING BUSINESS PROCESSES

(76) Inventors: George S. Mentrup, 3608 NE. 49th St., Kansas City, MO (US) 64119; Paul Damien, 8807 Glenlake Dr., Austin, TX (US) 78730

( * ) Notice: Subject to any disclaimer, the term of this patent is extended or adjusted under 35 U.S.C. 154(b) by 753 days.

(21) Appl. No.: 09/595,354

(22) Filed: Jun. 15, 2000

Related U.S. Application Data

(60) Provisional application No. 60/139,279, filed on Jun. 15, 1999.

(51) Int. Cl.[7] .................. G09C 1/06; H04N 7/167; H04L 9/00; G06K 9/18
(52) U.S. Cl. .................. 380/56; 380/210; 380/213; 380/216; 705/57; 705/58; 382/184
(58) Field of Search .................. 380/56, 210, 213, 380/216; 705/57–58; 382/184, 320; 235/449; 713/184

(56) References Cited

U.S. PATENT DOCUMENTS

| | | |
|---|---|---|
| 4,529,870 A | 7/1985 | Chaum |
| 4,593,936 A | 6/1986 | Opel |
| 4,700,055 A | 10/1987 | Kashkashian, Jr. |
| 4,734,040 A | 3/1988 | North et al. |
| 4,816,653 A | 3/1989 | Anderl et al. |
| 4,870,683 A * | 9/1989 | Atalla .................. 380/56 |
| 5,246,375 A | 9/1993 | Goede |
| 5,251,259 A | 10/1993 | Mosley |
| 5,321,755 A | 6/1994 | Vlaar |
| 5,326,964 A | 7/1994 | Risser |
| 5,530,232 A | 6/1996 | Taylor |
| 5,578,808 A | 11/1996 | Taylor |
| 5,742,035 A | 4/1998 | Kohut |
| 6,055,635 A * | 4/2000 | Karlsson .................. 713/184 |
| 6,590,997 B2 * | 7/2003 | Rhoads .................. 382/100 |

\* cited by examiner

*Primary Examiner*—Gilberto Barrón
*Assistant Examiner*—Kambiz Zand
(74) *Attorney, Agent, or Firm*—Marcia J. Rodgers; Dennis A. Crawford; Shughart, Thomson & Kilroy, P.C.

(57) ABSTRACT

An encryption device includes a card with a grid comprising multiple rows and columns defining boxes for receiving individual characters. One of the columns or rows contains a master password or code character string. Other columns or rows contain encrypted character strings. The individual characters of the master password can be offset with respect to corresponding, individual characters of the encrypted character strings. A sleeve slidably, reciprocably receives the card and assists with aligning the characters of the master password and the characters of the encrypted character strings, which are visible through a window in the sleeve. A method of storing, encrypting and retrieving character strings utilizes the encryption device.

11 Claims, 14 Drawing Sheets

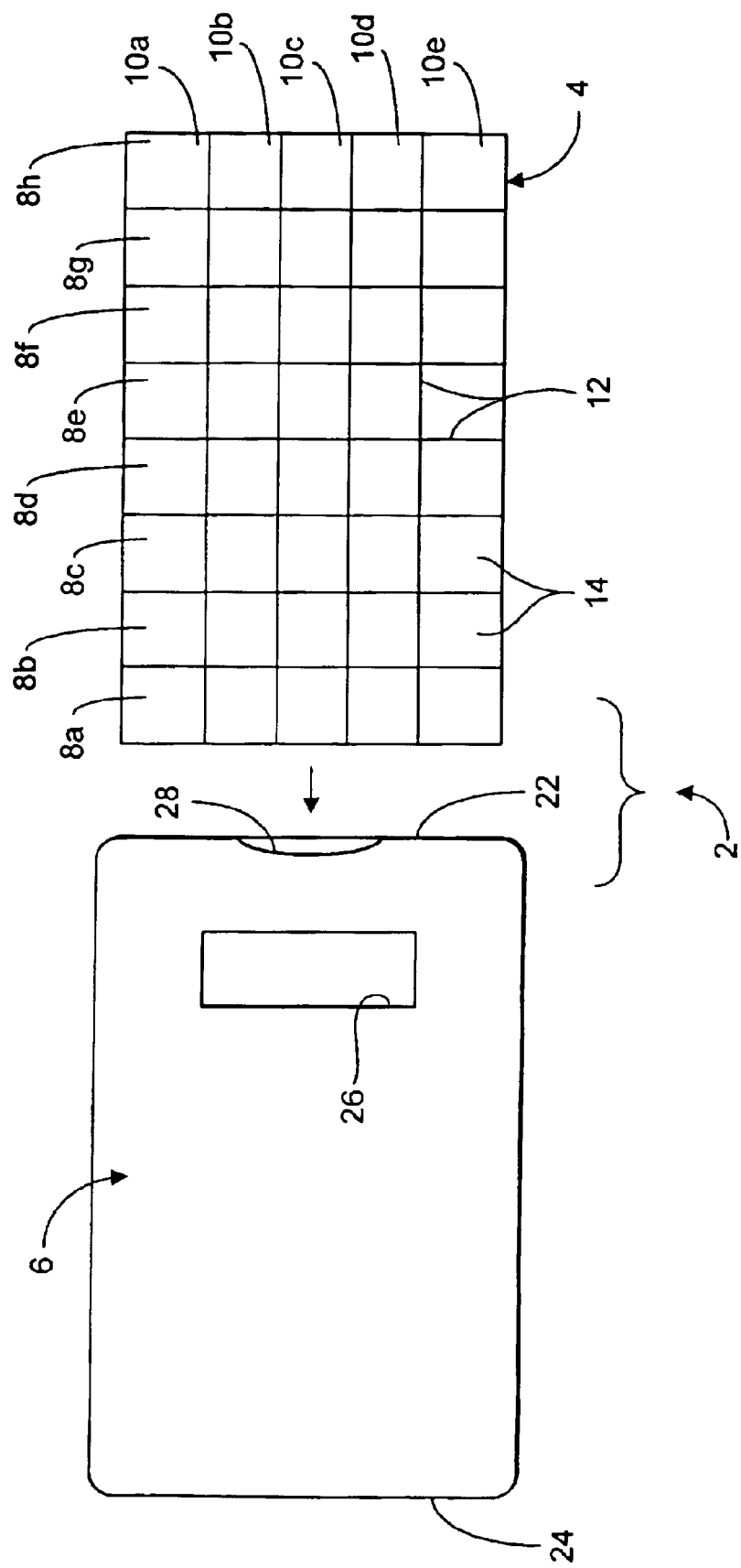

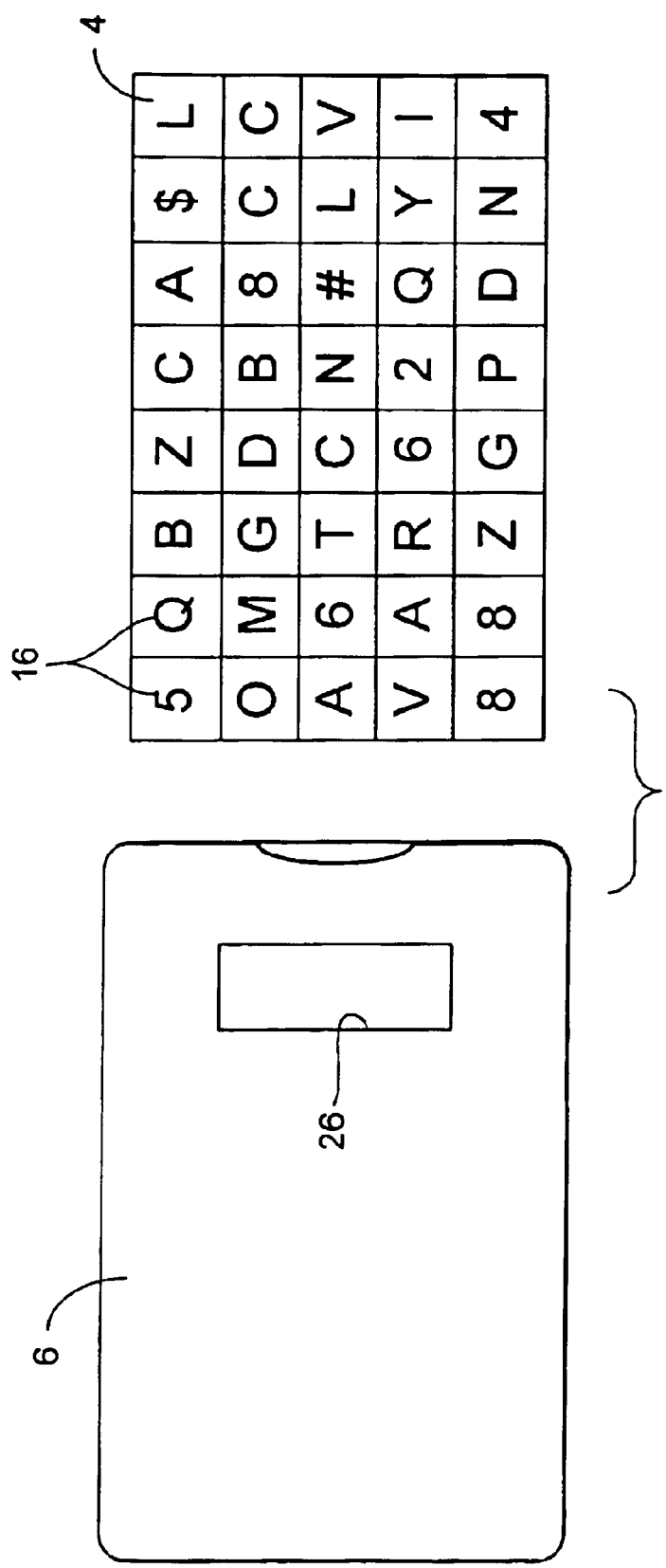

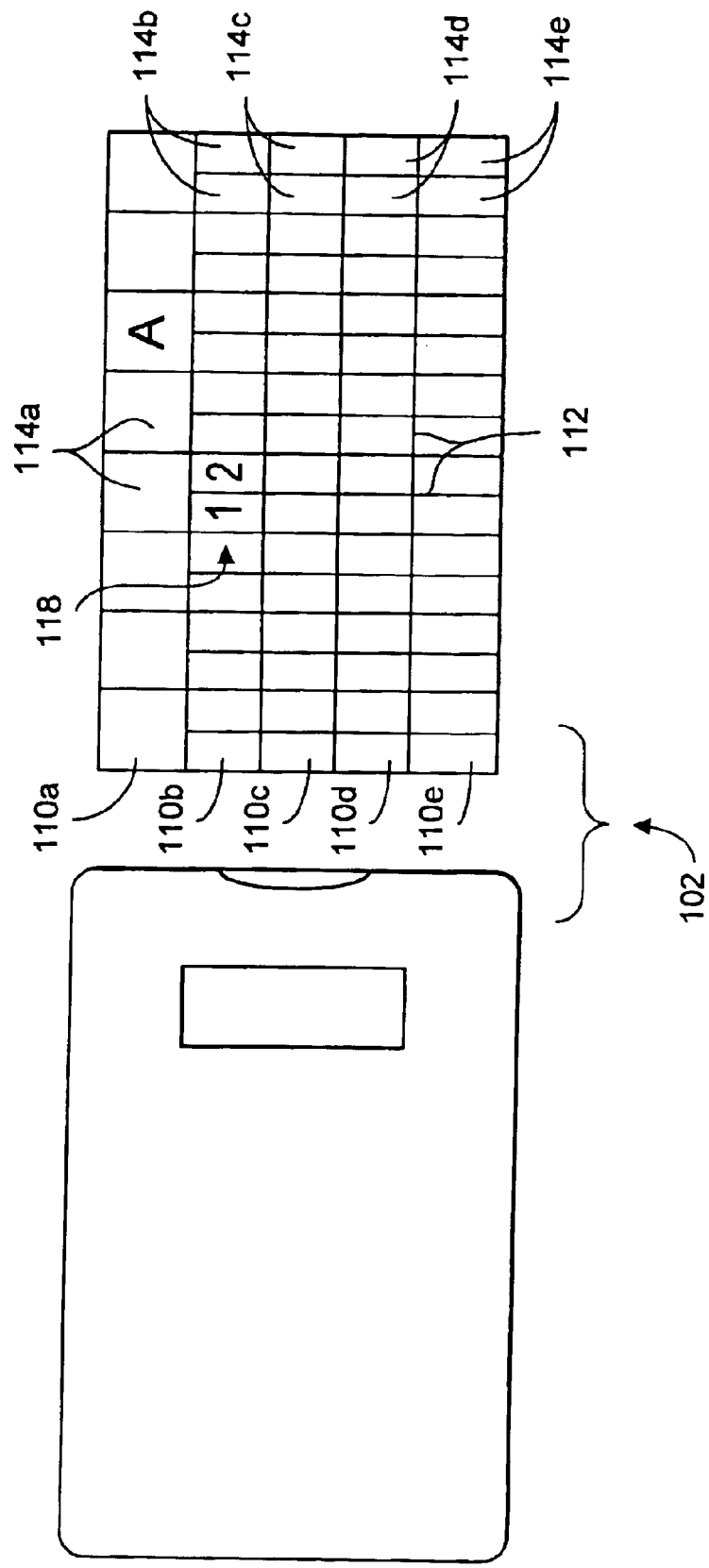

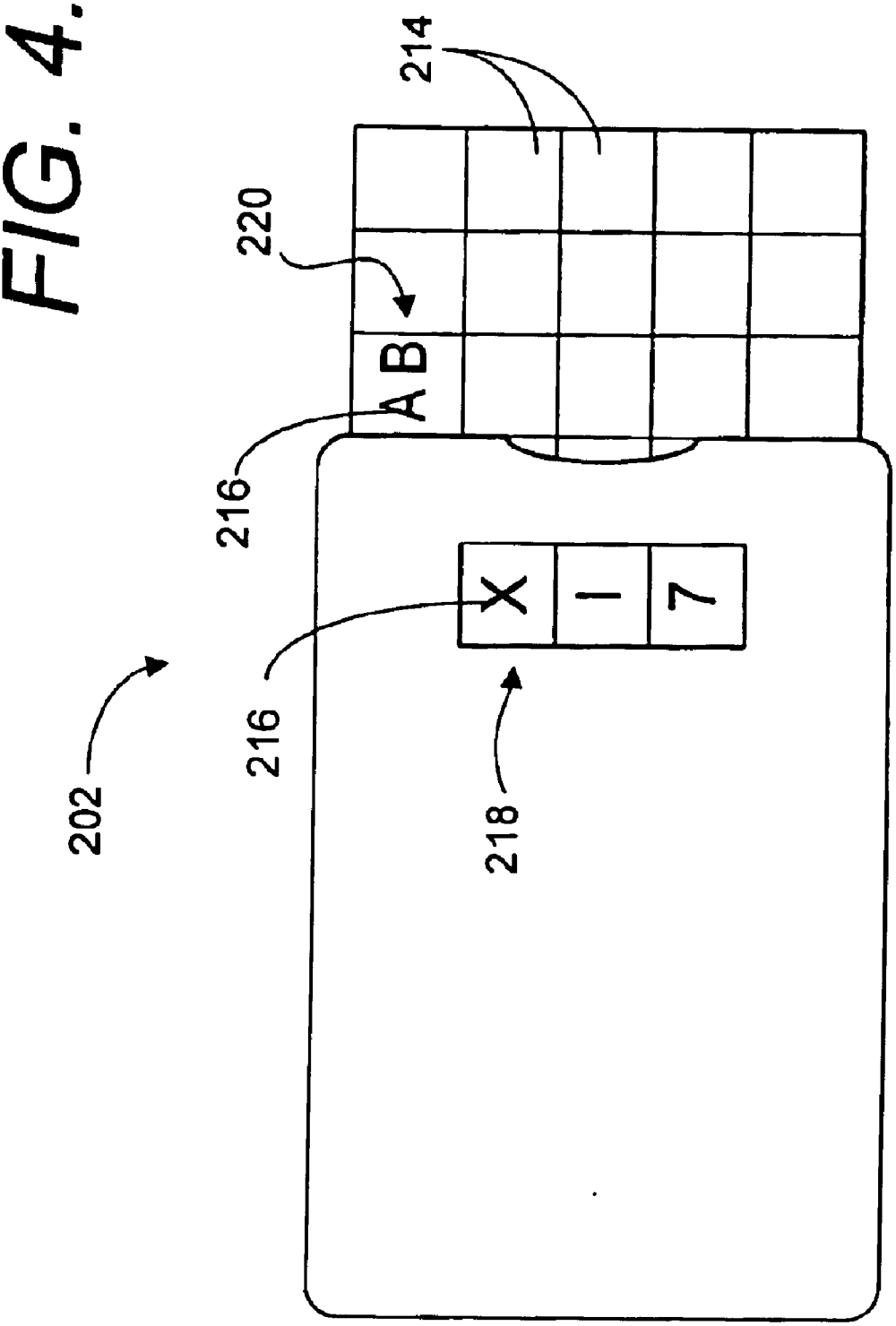

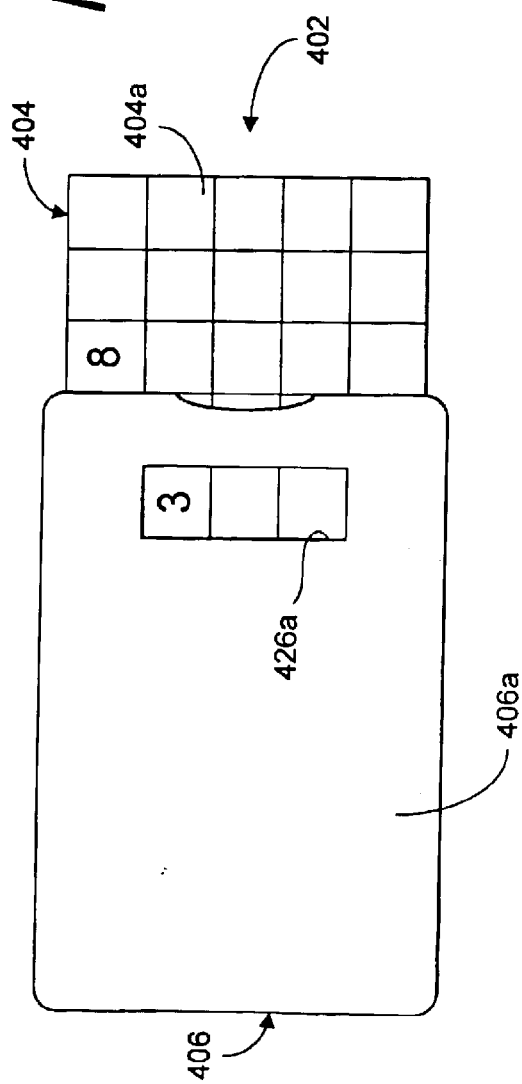
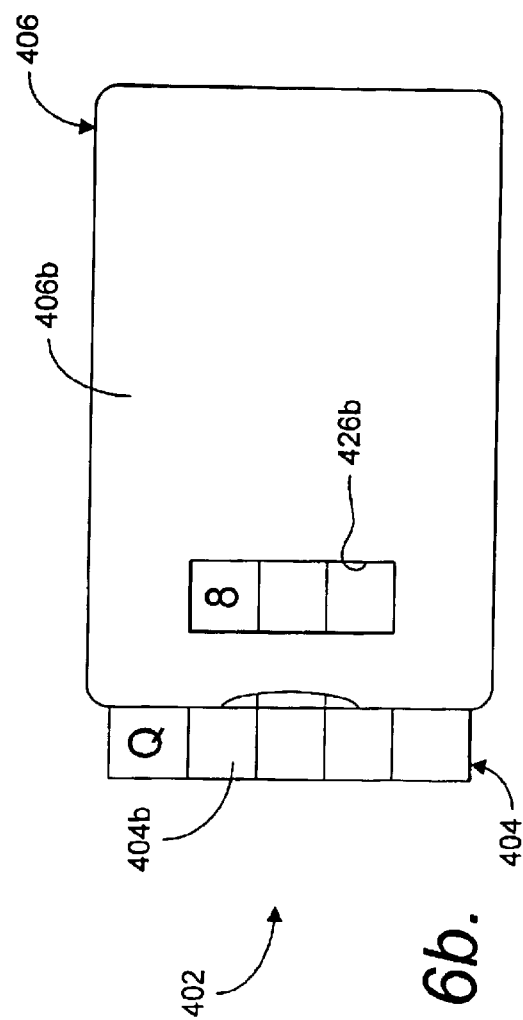

| B | 1 | Q | 1 | L | 5 | 604b |
|---|---|---|---|---|---|---|
| 2 | Q | 4 | T | N | X | |
| 3 | 3 | Q | X | S | Z | |
| 4 | 4 | g | c | Z | A | |
| 5 | 5 | h | t | X | C | |
| 6 | 6 | t | o | Y | C | |
| 7 | 7 | L | M | Q | 3 | |
| 8 | 8 | N | R | T | Y | 604 |

*FIG. 8f.*

| A | 1 | Z | Q | 1 | 7 | 604a |
|---|---|---|---|---|---|---|
| 2 | 2 | m | v | B | 5 | |
| 3 | 3 | i | e | R | Q | |
| 4 | 4 | 8 | Z | M | T | |
| 5 | 5 | Q | Y | M | S | |
| 6 | 6 | T | 5 | O | Y | |
| 7 | 7 | Y | R | 7 | X | |
| 8 | 8 | S | Q | B | R | 604 |

*FIG. 8e.*

US 6,826,281 B1

STORAGE-ENCRYPTION-RETRIEVAL DEVICE AND METHOD WITH RESULTING BUSINESS PROCESSES

PROVISIONAL PATENT APPLICATION

Applicants claim priority based on provisional patent application Ser. No. 60/139,279 filed on Jun. 15, 1999.

BACKGROUND OF THE INVENTION

1. Field of the Invention

The present invention relates generally to a device and method for storing, encrypting and retrieving strings of alphanumeric characters, said strings of characters representing personal, private information such as bank PIN numbers, computer log-in codes, and credit card numbers, for example.

2. Description of the Prior Art

With the ever-increasing use of computers and automated systems to provide a wide variety of services, consumers today often must remember a large number of passwords, log-in ID's, account numbers and the like. Consumers often must be able to recall and use this information at any time and at any location without access to records or documentation that contain the information. Thus, there is a need for a device and method to store important, personal information such as bank PIN's, charge account numbers, computer log-in ID's, calling card numbers, unlisted telephone numbers, and the like.

Much of the data that a consumer would want to store would be strings of characters which represent access codes. This might be a string of four numbers which represent a bank PIN that allows access to a bank account, or a string of eight letters which form a word that allows access to a computer system. Obviously, the consumer does not want unauthorized access to any accounts, computer systems, records, and the like. Thus, there is a need for a device and method that easily encrypts said information.

Consumers typically need to retrieve their access information when they are traveling, driving in their car, shopping and the like. Thus, it is important that said information can be quickly and easily retrieved. A consumer may get confused or forget how to use a complicated encryption/decryption device, or may have an electronic device that they either forgot to bring or that is not working properly. Thus, there is a need for a device and method that allow for quick and easy retrieval of said information and that is not subject to breakage or failure.

The Kohut U.S. Pat. No. 5,742,035 discloses a method of encrypting credit card PIN's using a 3 by 3 grid of preprinted numbers placed on the credit card itself. The four numbers comprising the PIN are placed in the 9-number grid in a location known only to the user and the card issuer. Although this method may work well for an individual credit card PIN number, it does not allow a user to store, encrypt or retrieve any other personal information.

The Vlaar U.S. Pat. No. 5,321,755 discloses a method of encrypting data which involves a slidable element contained within a cover element. The cover element is marked with locations for each of up to four numbers. The slidable element is then moved within the cover element to spell a codeword. The marked positions on the cover element then identify a number from one to ten on a number line also contained on the slidable element. This device and method appear to only be suitable for number codes up to four digits in length. This is because each number requires a position marker on its own line. Moreover, this method does not appear to be designed to handle letters or other characters. Also because a four digit number requires four separate lines for position markers, the cover element is severely limited as to how many numbers it can code because there simply is not enough room on the cover element.

Thus there is a need for a method and device that allows users to store, encrypt and retrieve a variety of personal information with a wide range of character lengths that is easy, quick, inexpensive, and convenient.

SUMMARY OF THE INVENTION

In the practice of the present invention, an encryption device and method are provided for storing, encrypting and retrieving multiple encrypted character strings utilizing a single code character string or master password. The device includes a card with a grid printed thereon having multiple rows and columns. The master password can be located in any row or in any column. Encrypted character strings are then retrieved from the other rows or columns. A sleeve can be used to assist the user with locating the individual characters of the encrypted character strings where the characters being retrieved are offset from the corresponding characters of the master password by a predetermined number of columns. The master password and encrypted character strings can be oriented in various directions on front and back faces of the card on which they are encrypted. The device is user programmable, and reprogrammable, whereby security of the device is within the control of the user.

PRINCIPLE OBJECTS AND ADVANTAGES OF THE INVENTION

The principle objects and advantages of the present invention include: providing an encryption device and method; providing such a device and method for storing, encrypting and retrieving character strings; providing such a device which is user programmable; providing such a device which is reprogrammable; providing such a device which provides substantial security within the control of a user; providing such a device which can replace credit and debit cards; providing such a device which accommodates a wide variety of formats for character input; providing such a device which reduces the need to remember multiple character strings; providing such a device which can be utilized for promotional purposes by printing commercial messages thereon; and providing such a device which is economical to manufacture, efficient in operation in particularly well adapted for the proposed use thereof.

BRIEF DESCRIPTION OF THE DRAWINGS

FIG. 1 is a front elevational view of an encryption device embodying the present invention.

FIGS. 2a–e are front elevational views thereof, showing the steps of the method of the present invention.

FIG. 3 is a front elevational view of an encryption device comprising a first modified embodiment of the present invention.

FIG. 4 is a front elevational view of an encryption device comprising a second modified embodiment of the present invention.

FIGS. 6a,b are front and back elevational views of an encryption device comprising a fourth modified embodiment of the present invention.

DETAILED DESCRIPTION OF THE PREFERRED EMBODIMENTS

I. Introduction and Environment

Figure 2A:
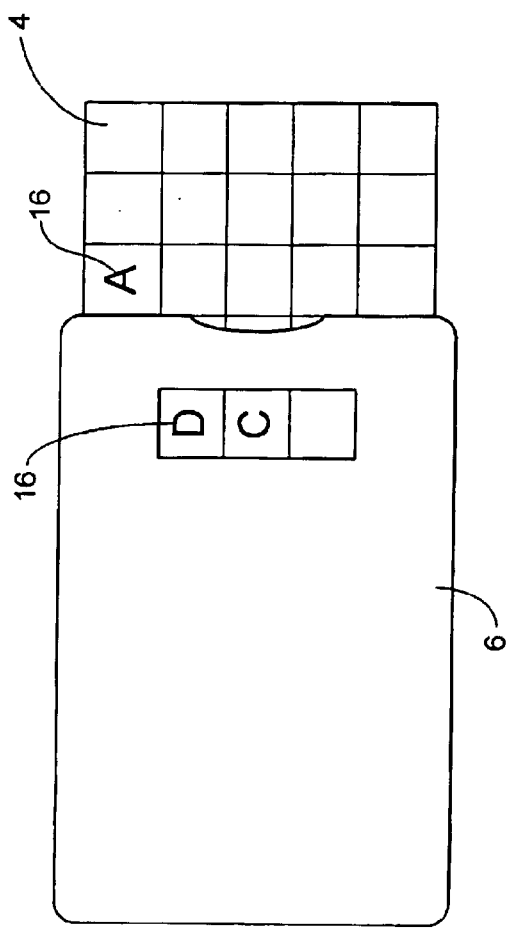

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Encryption Device 2 and Method

Referring to the drawings in more detail, FIG. 1 shows an encryption device 2 embodying the present invention and generally comprising a card 4 and a sleeve 6. The card 4 may be made of paper, plastic, cardboard, or other suitable material which allows a user to imprint or mark on its surface. The dimensions of the card 4 should be such that it can be conveniently carried by the user. In the preferred embodiment, the dimensions of the card 4 are approximately the dimensions of a standard credit card. However, various other suitable dimensions can be used, including dimensions corresponding to the size of a note card or the size of a notebook.

Displayed on the surface of the card 4 is a geometric grid 12. The geometric grid 12 is comprised of individual graphic boxes 14 of a size large enough to accept one or more characters 16. The graphic boxes 14 are arrayed in five rows 10a–e and eight columns 8a–h forming the geometric grid 12. The geometric grid 12 may be imprinted or otherwise affixed to the card 4 in any fashion.

In the embodiment shown in FIGS. 1 and 2a–e, three encrypted character strings 18 can be stored within the geometric grid 12 in the middle rows 10b–d. The top row 10a is used for a master password or code character string 20 and the bottom row 10e is concealed by the sleeve 6.

The sleeve 6 includes open and closed ends 22, 24; a three-row by one-column window 26 through which the grid 12 is visible and a recess 28 at the open end 22 to facilitate reciprocably sliding the card 4 within the sleeve 6.

FIGS. 2a–e show the method of programming or encrypting stored character strings 18 (comprising "DOG" and "CAT") for retrieval using a password or master code character string 20 (comprising "ABC"). FIG. 2a shows inputting the first letters of the code and encrypted character strings 20, 18. The master string 20 is recorded in the boxes 14 in such a mixed or scrambled order that the correct order of the characters of the master string 20 is not readily apparent. Then, by aligning the open end 22 of the sleeve 6 with each character of the master string 20, a character of the encrypted or data string 18 is recorded on the grid 12 through the window 26 of the sleeve 6 to establish a fixed geometric offset or correspondence between the characters of the master string 20 and the encrypted string 18. More specifically, the first letter of the code character string 20 ("A") is input on the upper row 10a and the first letters (i.e., "D" and "C") of the encrypted character strings 18 are input in the upper two boxes 14 visible through the window 26. The window 26 and the open end 22 of the sleeve 6 cooperate to automatically offset the characters 16 of the code character string 20 and the corresponding, respective characters of the encrypted character strings 18.

Figure 2B:
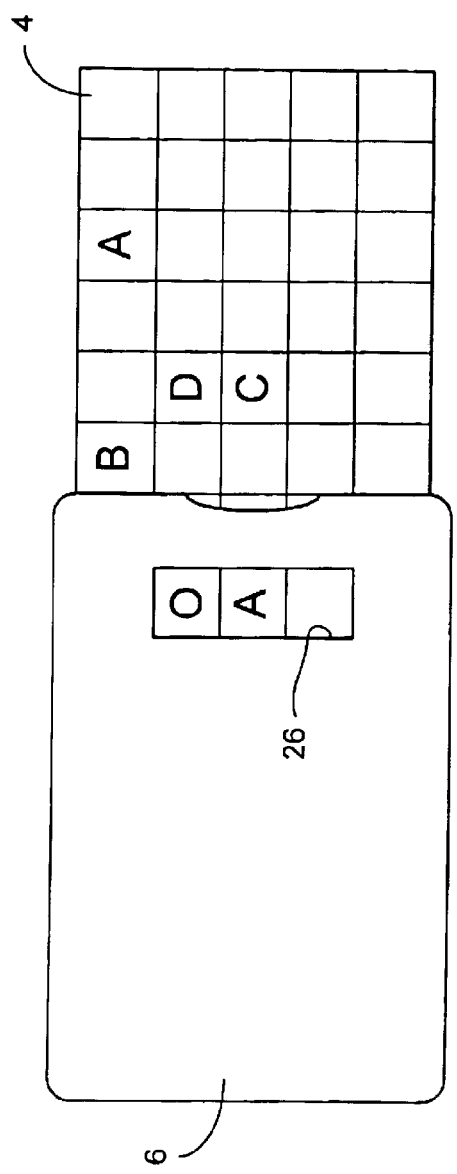
Figure 2C:
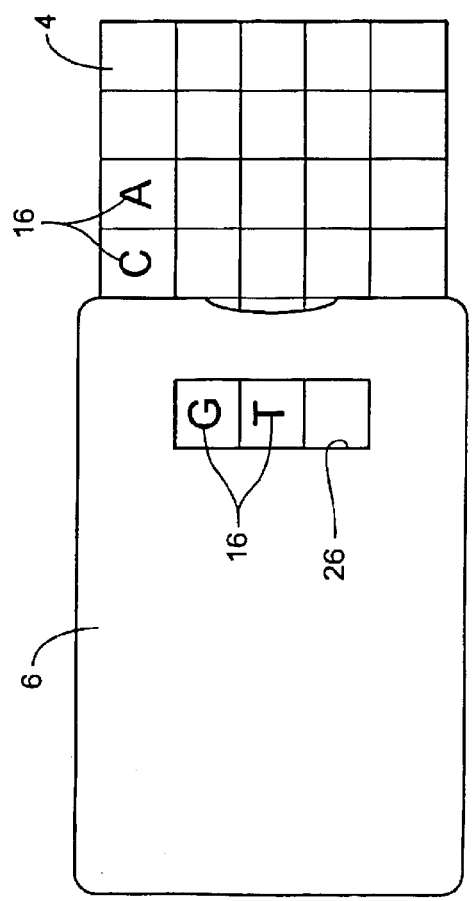
Figure 2D:
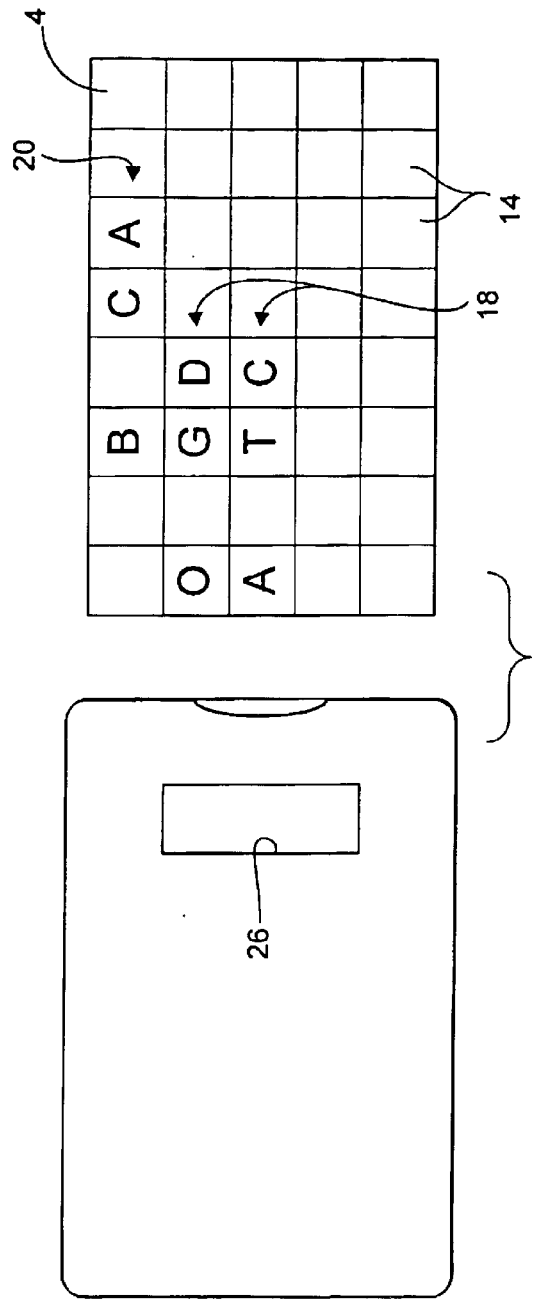

FIGS. 2b–d show the method steps for adding the rest of the characters 16 comprising the character strings 18, 20 and the resulting card 4, which can be completely filled in with dummy characters as shown in FIG. 2e. A user only needs to remember the code character string or master password 20 in order to retrieve the encrypted character strings 18 by repositioning the card 4 within the sleeve 6 whereby the code character string characters 16 are located adjacent to the sleeve open end 22 when the corresponding characters 16 of the encrypted character strings 18 are displayed in the window 26.

Variations on the above device and method include encrypting character strings 18 with fewer characters 16 than the code character string 20. This situation can be accommodated by using the first character 16 to identify the number of characters in an encrypted character string 18, or by utilizing a specific, user-defined "end-of-string" character.

III. First Modified Embodiment Encryption Device 102 and Method

FIG. 3 shows a modified encryption device 102 comprising a first modified embodiment of the present invention. A modified card 4 includes a grid 112 with an upper row 110a of boxes 114a for a master password or code character string 120 and rows 110b–e of boxes 114b–e which are half the size of the boxes 114a whereby a 1-to-2 ratio of code character string boxes 114a to encrypted character string boxes 114b–e is provided. Thus, a master password or code character string 120 can yield encrypted character strings 118 with twice as many characters.

IV. Second Modified Embodiment Encryption Device 202 and Method

FIG. 4 shows an encryption device 202 comprising a second modified embodiment of the present invention. The device 202 uses a code character string 220 with two encrypted character string characters 216 for each character 216 of the encrypted character string 218. The master password can be identified from either the left or right individual characters 216 in each of the boxes 214.

V. Third Modified Embodiment Encryption Device 302 and Method

Figure 5B:
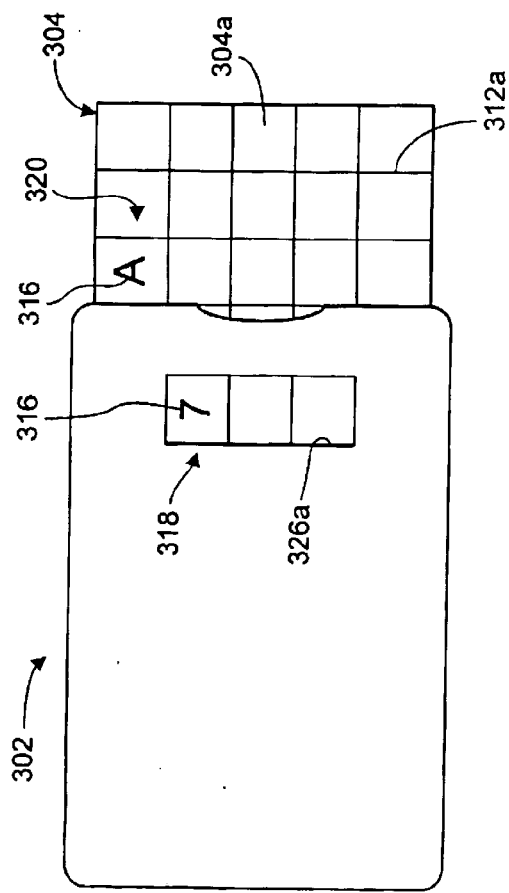
FIGS. 5a,b are front and back elevational views of an encryption device comprising a third modified embodiment of the present invention.
Figure 5A:
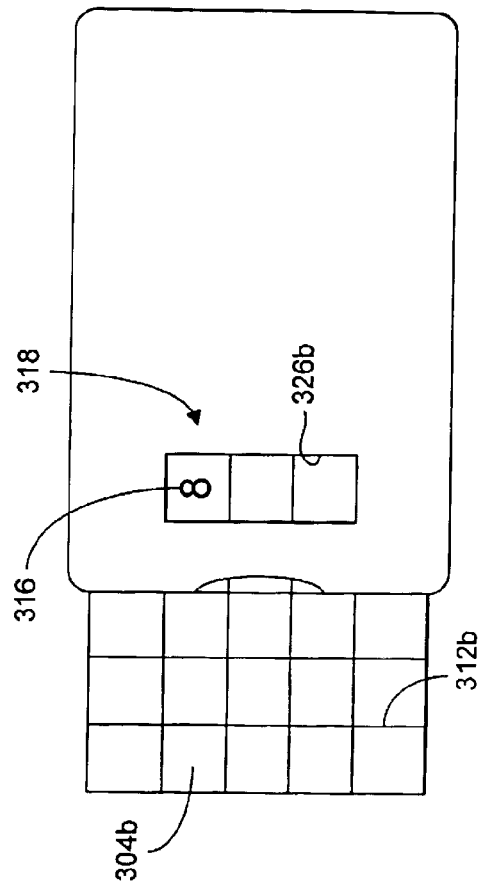

FIGS. 5a,b show an encryption device 302 comprising a third modified embodiment of the present invention. The encryption device 302 includes a modified card 304 with a front 304a and a back 304b. Front and back windows 326a,b reveal front and back grids 312a,b. The card 304 has portions of the encrypted character strings 318 imprinted in the front and back grids 312a,b respectively. The data encryption method utilizing the encryption device 302 involves alternating the encrypted character readings from the front 304a and back 304b of the card. For example, two characters 316 of the encrypted character string 318 can be obtained through the front and back windows 326a,b by aligning the card 304 with the respective character 316 of the master password and sequentially reading the exposed characters 316 of the encrypted character string 320.

VI. Fourth Modified Embodiment Encryption Device 402 and Method

A two-sided encryption device 402 comprising a fourth modified embodiment of the present invention is shown in FIGS. 6a,b and includes a card sleeve 406 with a similar front 406a and back 406b with respective windows 426a,b. A card 404 likewise has a similar front 404a and back 404b. The front and back of the device 402 can be used independently or in conjunction with each other to store either twice as many encrypted characters strings or the same number of character strings with twice the length of character strings that can be stored with a single-sided device.

VII. Fifth Modified Embodiment Encryption Device 502 and Method

Figure 7B:
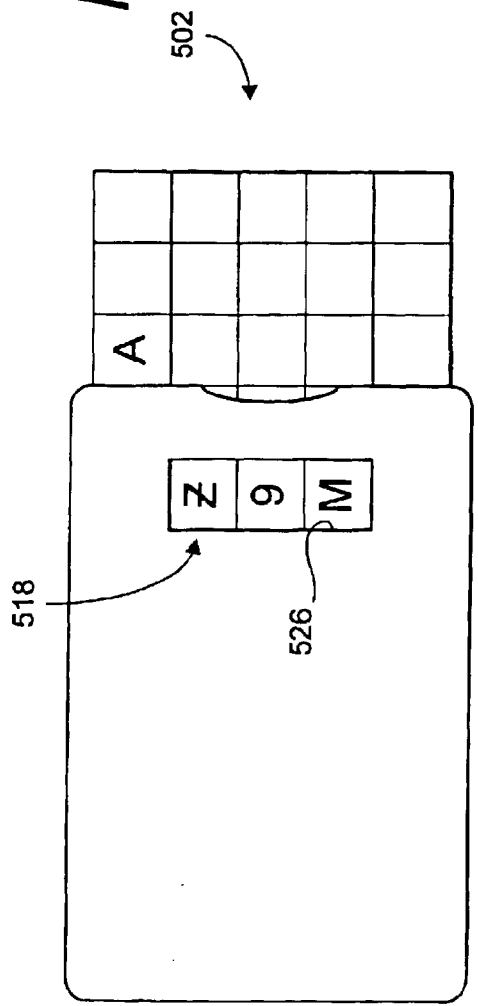
FIGS. 7a,b are front elevational views of an encryption device comprising a fifth modified embodiment of the present invention.
Figure 7A:
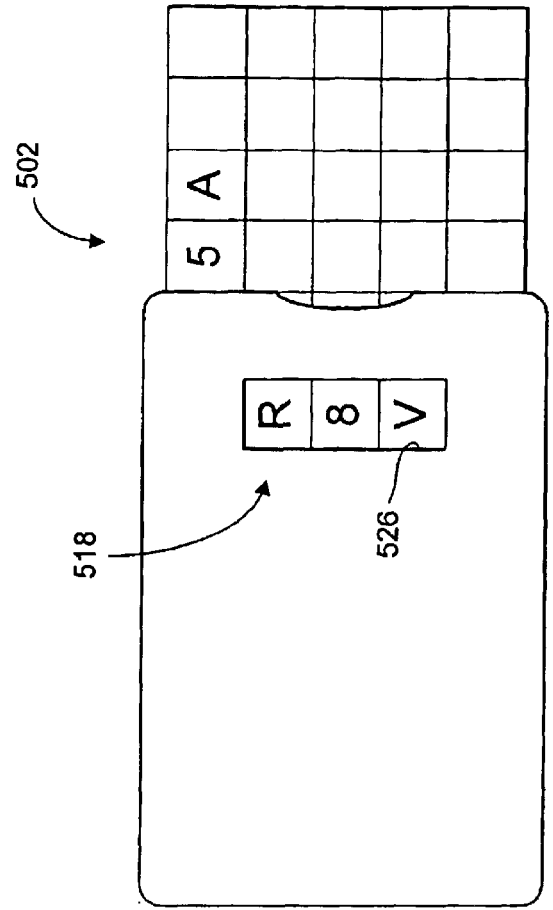
Figure 8B:
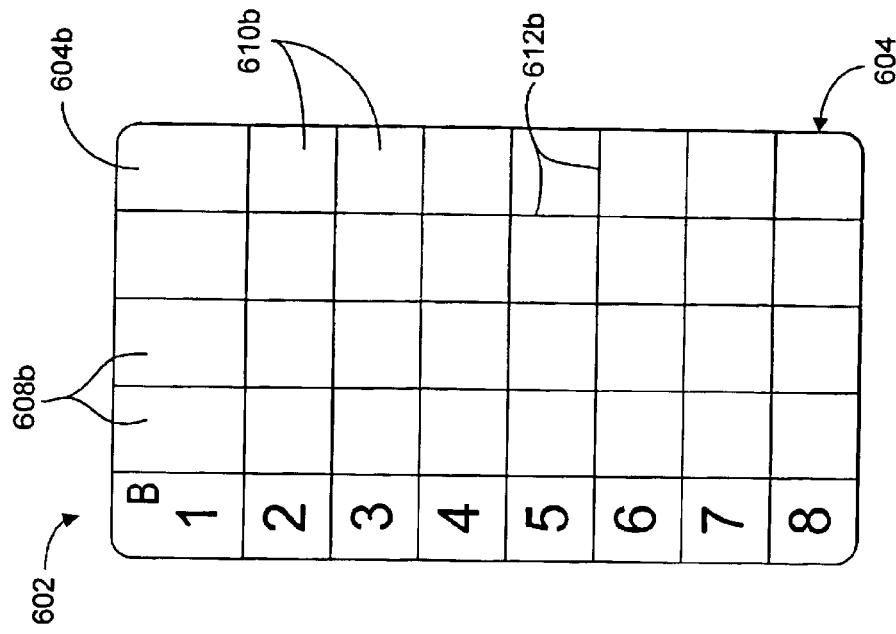
FIGS. 8a,c and e and FIGS. 8b,d and f are front and back elevational views respectively of an encryption device comprising a sixth modified embodiment of the present invention.
Figure 8A:
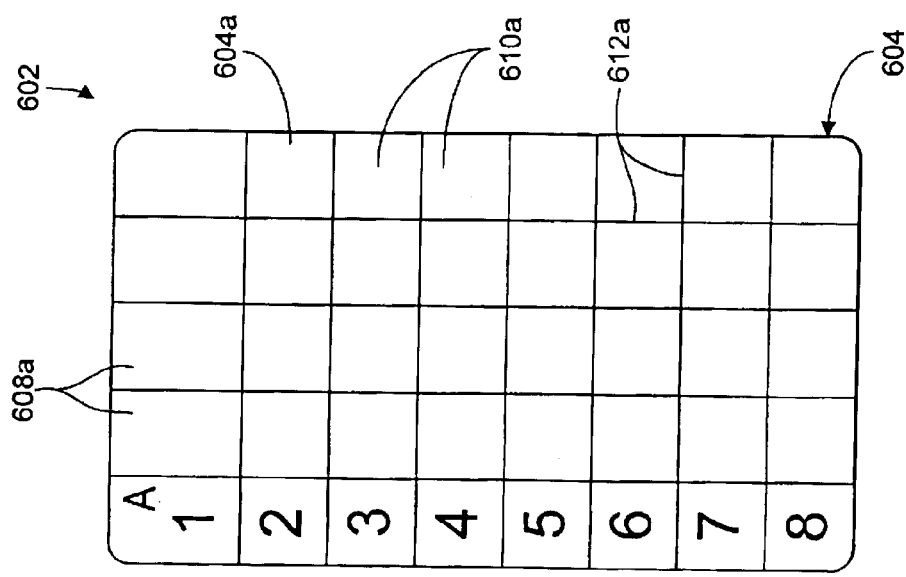

FIGS. 7a,b show an encryption device 502 with the encrypted two-character strings 518 arranged vertically within the window 526. Thus, in practicing the method of the present invention with the device 502, the master password "A5" would yield the encrypted character string "Z9MR8V".

VIII. Sixth Modified Embodiment Encryption Device 602 and Method

An encryption device 602 comprising a sixth modified embodiment of the present invention is shown in FIGS. 8a–f. The device 602 includes a card 604 with a front 604a and a back 604b. A front grid 612a includes columns 608a and rows 610a. A back grid 612b includes columns 608b and rows 610b. A master password can comprise a predetermined sequence of alphabetical and numerical characters. For example, the master password "A 2B3A1" yields "MIGHTY" and "VECTOR". "A2" indicates read two letters ("MI") on the front 604a, beginning in row 2. "B3" indicates read three letters ("GHT") on the back 604b. "A1"[1] indicates read one letter ("Y") on the front 604a. "VECTOR" is obtained in a similar manner from the adjacent columns on the front 604a and on the back 604b.

IX. Seventh Modified Embodiment Encryption Device 702 and Method

Figure 9:
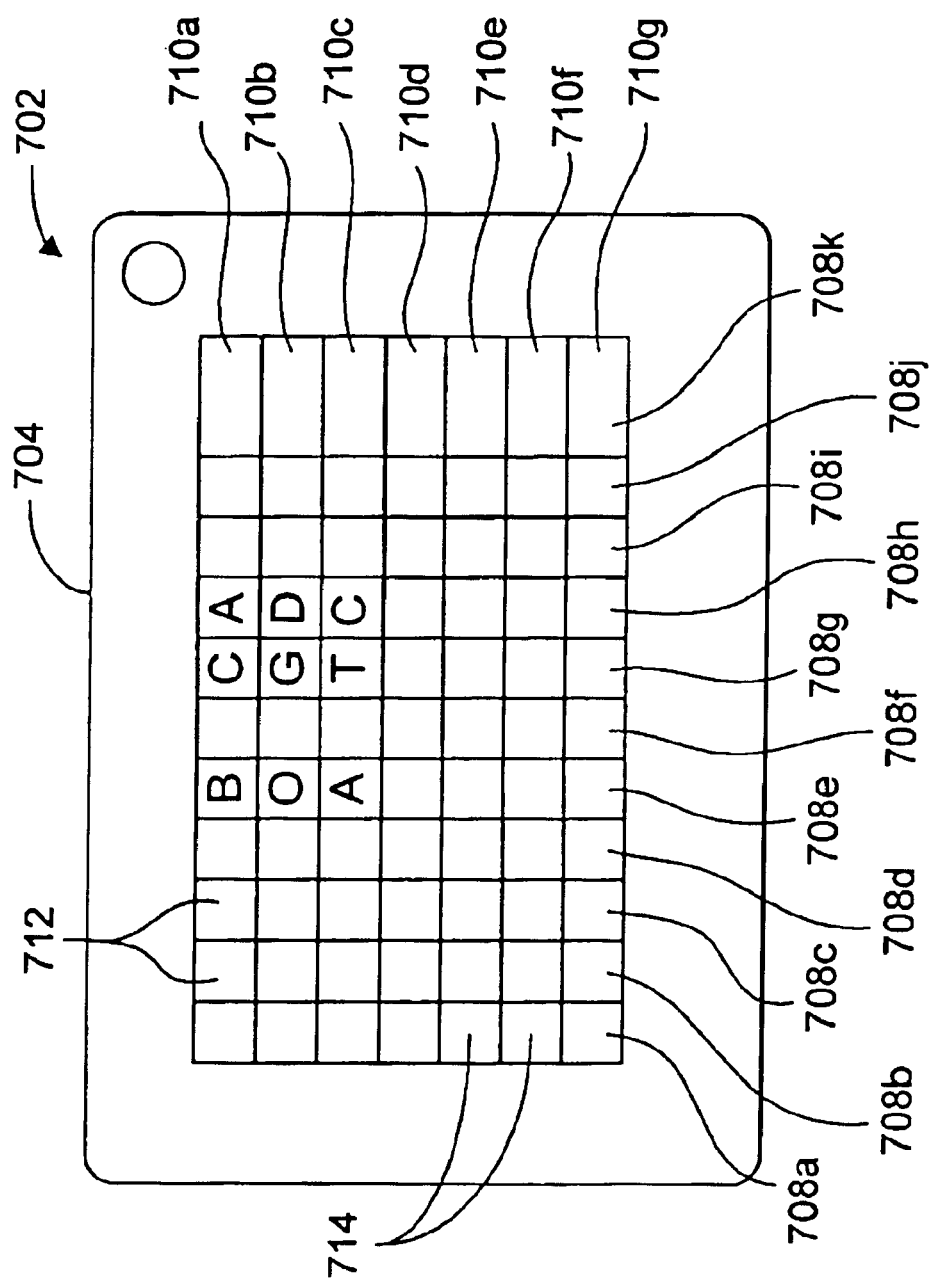
FIG. 9 is a front elevational view of an encryption device comprising a seventh modified embodiment of the present invention.

FIG. 9 shows an encryption device 702 comprising a seventh modified embodiment of the present invention. The encryption device 702 comprises a card 704 with a grid 712 comprising multiple columns 708a–k and multiple rows 710a–g defining individual boxes 714. The encryption device 702 operates in a manner similar to the encryption device 2 described above, except that no sleeve is provided and the user is thus able to program the master password and the encrypted character strings with any offset desired, or with no offset. Thus, the corresponding individual characters of the master password and the encrypted character strings can align vertically. For example, the master password "ABC" yields the encrypted the character strings "DOG" and "CAT", with the corresponding characters of the master password and the encrypted character strayings aligning vertically. The rightmost column 708k can be used for abbreviated labels.

The encryption methods discussed above are generally available with the encryption device 702. Thus, the encryption device 702 can be printed on both sides, and vertical master passwords can be employed. Among the variations available for operating the method are encrypting the character strings to read from left-to-right, right-to-left, top-to-bottom and bottom-to-top.

X. Eighth Modified Embodiment Encryption Device 802 and Method

Figure 10:
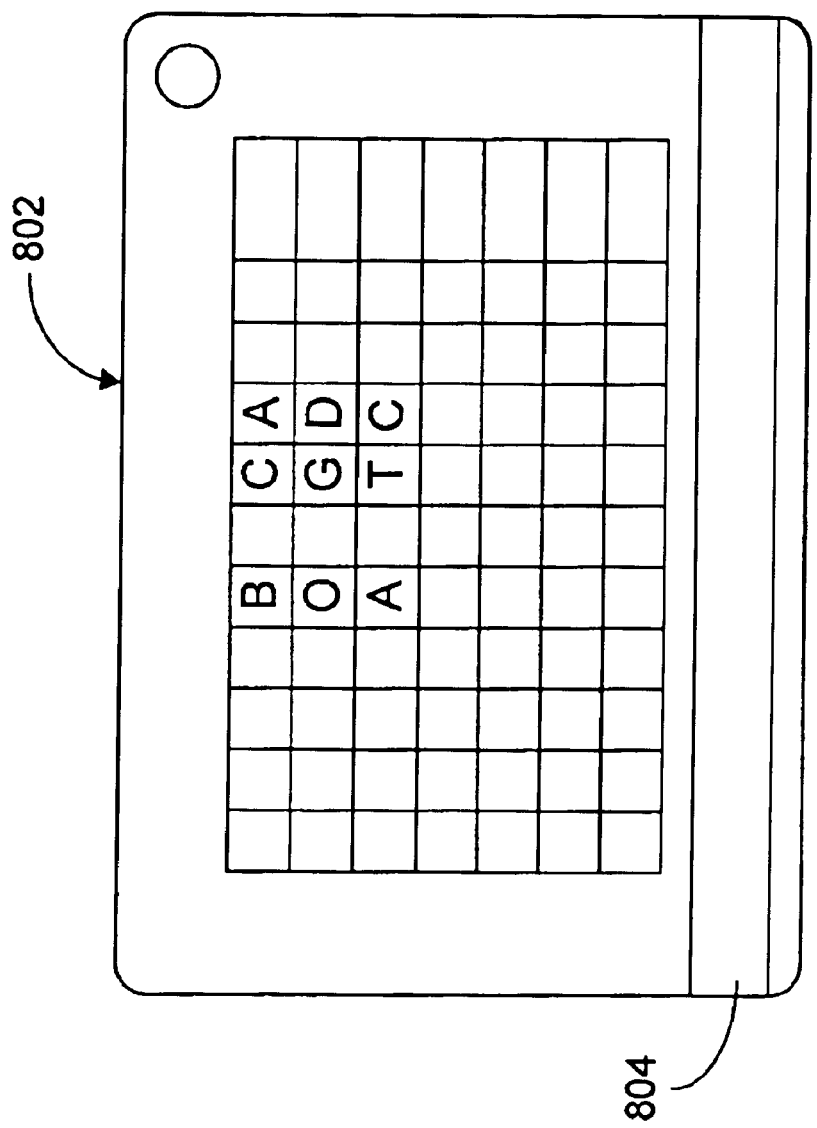
FIG. 10 is a front elevational view of an encryption device comprising an eighth modified embodiment of the present invention.

FIG. 10 shows an encryption device 802 comprising an eighth modified embodiment of the present intention. The encryption device 802 is similar to the sleeveless card 702 described above, with the addition of a magnetic strip 804 adapted for identification and verification purposes. The encryption device 802 functions as a credit or debit card whereby the strip 804 can be swiped. The master password can be used for retrieving multiple encrypted character strings, which can correspond to the numbers of various credit and debit cad accounts. Thus, a single encryption device 802 can replace a number of credit and/or debit cards.

It is to be understood that while certain forms of the present intention have been illustrated and described herein, it is not to be limited to the specific forms or arrangements of components and/or steps described and shown.

We claim:

1. A method for encrypting and retrieving a data word having a data sequence of data characters using a two dimensional grid of boxes on an encryption sheet and comprising the steps of:

(a) selecting a master word having a known master sequence of master characters;

(b) recording said master word on said encryption sheet in a scrambled sequence of said master characters other than said master sequence along a master line of said boxes of said grid;

(c) recording said data word along a data line of boxes of said grid in said scrambled sequence by a fixed geometric offset of each of said data characters to at least one of said master characters;

(d) retrieving said data word by finding said master characters in said scrambled sequence and locating said data characters by reference to said fixed geometric offset of said data characters respectively to said master characters in said scrambled sequence;

(e) providing said grid of boxes on both of opposite sides of said encryption sheet;

(f) recording said scrambled sequence on said encryption sheet by alternating from master character to master character onto opposite sides of said encryption sheet; and (g) recording said data word in said scrambled sequence as alternated on said opposite sides of said encryption sheet.

2. A method for encrypting and retrieving a data word having a data sequence of data characters using a two dimensional grid of boxes on an encryption sheet and comprising the steps of:

(a) selecting a master word having a known master sequence of master characters;

(b) recording said master word on said encryption sheet in a scrambled sequence of said master characters other than said master sequence along a master line of said boxes of said grid;

(c) recording said data word along a data line of boxes of said grid in said scrambled sequence by a fixed geometric offset of each of said data characters to at least one of said master characters;

(d) retrieving said data word by finding said master characters in said scrambled sequence and locating said data characters by reference to said fixed geometric offset of said data characters respectively to said master characters in said scrambled sequence; and (e) recording a second data word of second data characters along a second data line of boxes of said grid in said grid sequence by said fixed geometric offset of each second data character to at least one of said master characters.

3. A method for encrypting and retrieving a data word having a data sequence of data characters using a two dimensional grid of boxes on an encryption sheet and comprising the steps of:
   (a) selecting a master word having a known master sequence of master characters;
   (b) recording said master word on said encryption sheet in a scrambled sequence of said master characters other than said master sequence along a master line of said boxes of said grid;
   (c) recording said data word along a data line of boxes of said grid in said scrambled sequence by a fixed geometric offset of each of said data characters to at least one of said master characters;
   (d) retrieving said data word by finding said master characters in said scrambled sequence and locating said data characters by reference to said fixed geometric offset of said data characters respectively to said master characters in said scrambled sequence;
   (e) providing a sleeve sized and shaped to receive said encryption sheet therein, said sleeve having an outer end and a character window positioned in a selected fixed geometric offset relationship to said outer end; and
   (f) employing said outer end of said sleeve with and said character window to record said data characters in said fixed geometric offset and to thereby retrieve said data characters by said fixed geometric offset of said data characters to said master characters in said scrambled sequence.

4. A method for encrypting and retrieving a data word having a data sequence of data characters using a two dimensional grid of boxes on an encryption sheet and comprising the steps of:
   (a) selecting a master word having a known master sequence of master characters;
   (b) recording said master word on said encryption sheet in a scrambled sequence of said master characters other than said master sequence along a master line of said boxes of said grid;
   (c) recording said data word along a data line of boxes of said grid in said scrambled sequence by a fixed geometric offset of each of said data characters to at least one of said master characters;
   (d) retrieving said data word by finding said master characters in said scrambled sequence and locating said data characters by reference to said fixed geometric offset of said data characters respectively to said master characters in said scrambled sequence;
   (e) said data word being a first data word, said master word being a first master word, and said first data word and said master word being recorded on a first grid of boxes on a first side of said encryption sheet; and including the steps of:
      (1) selecting a second master word having a known second master sequence of second master characters;
      (2) recording said second master word on said encryption sheet in a second scrambled sequence of said second master characters other than said second master sequence along a second master line of boxes of a second grid on a second side of said encryption sheet;
      (3) recording said second data word along a second data line of boxes of said second grid in said second scrambled sequence by said fixed geometric offset of each of said second data characters to a respective one of said second master characters; and
      (4) retrieving said second data word by finding said second master characters in said second scrambled sequence and locating said second data characters by reference to said flexed geometric offset of said second data characters respectively to said second master characters.

5. A method for encrypting and retrieving a data word having a data sequence of data characters using a two dimensional grid of boxes on an encryption sheet and comprising the steps of:
   (a) providing a sleeve sized and shaped to receive said encryption sheet therein, said sleeve having an outer end and a character window positioned in a selected fixed geometric relationship to said outer end;
   (b) selecting a master word having a known master sequence of master characters;
   (c) recording said master word on said encryption sheet in a scrambled sequence of said master characters other than said master sequence along a master line of said boxes of said grid;
   (d) recording said data word along a data line of boxes of said grid in said scrambled sequence by a fixed geometric offset of each of said data characters to at least one of said master characters by aligning said outer end of said sleeve with a master character and recording a data character on said encryption sheet through said character window to establish said fixed geometric offset; and
   (e) retrieving said data word by finding said master characters in said scrambled sequence and locating said data characters by reference to said fixed geometric offset of said data characters respectively to said master characters in said scrambled sequence by aligning said outer end of said sleeve with each master character and reading a corresponding data character through said character window.

6. A method as set forth in claim 5 and including the step of: establishing said fixed geometric offset between each master character and a selected plurality of data characters.

7. A method as set forth in claim 5 and including the step of: establishing said fixed geometric offset between a selected plurality of master characters and each data character.

8. A method as set forth in claim 5 and including the steps of:
   (a) providing said grid of boxes on both of opposite sides of said encryption sheet;
   (b) recording said scrambled sequence on said encryption sheet by alternating from master character to master character onto opposite sides of said encryption sheet; and
   (c) recording said data word in said scrambled sequence as alternated on said opposite sides of said encryption sheet.

9. A method as set forth in claim 5 and including the step of: recording a second data word of second data characters along a second data line of boxes of said grid in said grid sequence by said fixed geometric offset of each second data character to at least one of said master characters.

10. A method as set forth in claim 5 wherein said data word is a first data word, said master word is a first master word, said first data word and said master word are recorded on a first grid of boxes on a first side of said encryption sheet; and including the steps of:
   (a) selecting a second master word having a known second master sequence of second master characters;

(b) recording said second master word on said encryption sheet in a second scrambled sequence of said second master characters other than said second master sequence along a second master line of boxes of a second grid on a second side of said encryption sheet;

(c) recording said second data word along a second data line of boxes of said second grid in said second scrambled sequence by said fixed geometric offset of each of said second data characters to a respective one of said second master characters; and (d) retrieving said second data word by finding said second master characters in said second scrambled sequence and locating said second data characters by reference to said fixed geometric offset of said second data characters respectively to said second master characters.

11. A method as set forth in claim 5 and including the steps of:

(a) providing a magnetic strip on said encryption sheet; and (b) recording in said magnetic strip an encoded sequence which is independent of said data word and said master word.

* * * * *

UNITED STATES PATENT AND TRADEMARK OFFICE
CERTIFICATE OF CORRECTION

PATENT NO. : 6,826,281 B1
DATED : November 30, 2004
INVENTOR(S) : Mentrup et al.

It is certified that error appears in the above-identified patent and that said Letters Patent is hereby corrected as shown below:

Column 8,
Line 61, the word "flexed" is corrected to read -- fixed --.

Signed and Sealed this

Twenty-second Day of February, 2005

JON W. DUDAS
*Director of the United States Patent and Trademark Office*